US011849251B2

(12) United States Patent
Geng et al.

(10) Patent No.: US 11,849,251 B2
(45) Date of Patent: Dec. 19, 2023

(54) METHOD AND DEVICE OF TRANSMITTING VIDEO SIGNAL, METHOD AND DEVICE OF RECEIVING VIDEO SIGNAL, AND DISPLAY DEVICE

(71) Applicant: BOE Technology Group Co., Ltd., Beijing (CN)

(72) Inventors: Lihua Geng, Beijing (CN); Xitong Ma, Beijing (CN); Xiao Zhang, Beijing (CN); Xianzhen Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 309 days.

(21) Appl. No.: 17/297,164

(22) PCT Filed: Sep. 15, 2020

(86) PCT No.: PCT/CN2020/115314
§ 371 (c)(1),
(2) Date: May 26, 2021

(87) PCT Pub. No.: WO2021/052323
PCT Pub. Date: Mar. 25, 2021

(65) Prior Publication Data
US 2022/0030193 A1    Jan. 27, 2022

(30) Foreign Application Priority Data

Sep. 20, 2019    (CN) .......................... 201910897811.9

(51) Int. Cl.
*H04N 7/04*        (2006.01)
*H04L 1/08*        (2006.01)
(Continued)

(52) U.S. Cl.
CPC ............... *H04N 7/04* (2013.01); *G09G 5/006* (2013.01); *H04L 1/08* (2013.01); *H04N 5/04* (2013.01);
(Continued)

(58) Field of Classification Search
CPC ....................................................... G09G 5/006
See application file for complete search history.

(56) References Cited

U.S. PATENT DOCUMENTS 5,418,853 A    5/1995    Kanota et al.
7,010,687 B2   3/2006    Ichimura
(Continued)

FOREIGN PATENT DOCUMENTS

CN    1085721 A    4/1994
CN    1313687 A    9/2001
(Continued)

OTHER PUBLICATIONS

Du et al. CN107888567A—Machine Translation (Year: 2018).*
(Continued)

*Primary Examiner* — Gustavo Polo
(74) *Attorney, Agent, or Firm* — WHDA, LLP

(57) ABSTRACT

The present disclosure provides a method and device of transmitting a video signal, a method and device of receiving a video signal, and a display device. The method of transmitting the video signal includes: acquiring the video signal, wherein the video signal contains a plurality of frame data; embedding configuration data for at least one frame data of the video signal in a previous invalid interval of the at least one frame data; and transmitting the video signal embedded with the configuration data.

16 Claims, 9 Drawing Sheets

(51) Int. Cl.
*H04N 5/04* (2006.01)
*G09G 5/00* (2006.01)
*H04N 21/435* (2011.01)
*H04N 21/485* (2011.01)

(52) U.S. Cl.
CPC ....... *H04N 21/435* (2013.01); *H04N 21/4854* (2013.01); *G09G 2370/10* (2013.01)

(56) References Cited

U.S. PATENT DOCUMENTS

| | | | |
|---|---|---|---|
| 7,209,496 | B2 | 4/2007 | Okamoto |
| 7,688,868 | B2 | 3/2010 | Okamoto |
| 8,064,361 | B2 | 11/2011 | Okamoto |
| 8,289,445 | B2 | 10/2012 | Yamashita |
| 8,891,934 | B2 | 11/2014 | Messmer |
| 11,109,047 | B2 | 8/2021 | Du et al. |
| 2001/0023484 | A1 | 9/2001 | Ichimura |
| 2002/0167972 | A1 | 11/2002 | Okamoto |
| 2007/0280302 | A1 | 12/2007 | Okamoto |
| 2009/0295987 | A1 | 12/2009 | Wei et al. |
| 2009/0296807 | A1 | 12/2009 | Cloutman |
| 2010/0007787 | A1 | 1/2010 | Yamashita |
| 2010/0020831 | A1 | 1/2010 | Okamoto |
| 2012/0321273 | A1 | 12/2012 | Messmer |
| 2014/0078248 | A1 | 3/2014 | Tsukagoshi |
| 2015/0071615 | A1 | 3/2015 | Messmer |
| 2015/0222847 | A1 | 8/2015 | Wei et al. |
| 2016/0241864 | A1 | 8/2016 | Loyd et al. |
| 2020/0244977 | A1 | 7/2020 | Du et al. |
| 2020/0252583 | A1 | 8/2020 | Du et al. |

FOREIGN PATENT DOCUMENTS

| | | |
|---|---|---|
| CN | 1384461 A | 12/2002 |
| CN | 101589611 A | 11/2009 |
| CN | 101594509 A | 12/2009 |
| CN | 102893602 A | 1/2013 |
| CN | 107888567 A | 4/2018 |
| CN | 108989729 A | 12/2018 |
| CN | 109348252 A | 2/2019 |
| CN | 109714622 A | 5/2019 |
| CN | 110536167 A | 12/2019 |
| WO | 2013/105401 A1 | 7/2013 |

OTHER PUBLICATIONS

English Translation of International Search Report dated Dec. 15, 2020, issued in counterpart Application No. PCT/CN2020/115314. (4 pages).

Office Action dated Jan. 28, 2021, in counterpart CN application No. 201910897811.9, with English Translation. (20 pages).

Office Action dated Sep. 7, 2021, in counterpart CN application No. 201910897811.9, with English Translation. (20 pages).

* cited by examiner

METHOD AND DEVICE OF TRANSMITTING VIDEO SIGNAL, METHOD AND DEVICE OF RECEIVING VIDEO SIGNAL, AND DISPLAY DEVICE

CROSS REFERENCE TO RELATED APPLICATION(S)

This application is a Section 371 National Stage Application of International Application No. PCT/CN2020/115314, which claims priority to Chinese Patent Application No. 201910897811.9, filed on Sep. 20, 2019, and the contents of which are incorporated herein by reference in its entirety.

TECHNICAL FIELD

The present disclosure generally relates to a field of display technology, and in particular to a method and device of transmitting a video signal, a method and device of receiving a video signal, and a display device.

BACKGROUND

When a video signal needs to be transmitted between two image processors, one processing method is to separately transmit the video signal and other relevant signals. For example, two data transmission channels are established between the two image processors. One data transmission channel is used to transmit the video signal, and the other data transmission channel is used to transmit relevant configuration information.

This processing method costs high and is difficult to ensure a synchronization of signal transmissions in the two data transmission channels. If the configuration information reaches a receiving end during a transmission of a frame of video image, it is easy to cause a split display of the frame of video image and result in a non-uniform picture.

SUMMARY

The present disclosure proposes a method and device of transmitting a video signal, a method and device of receiving a video signal, and a display device.

According to one aspect of the present disclosure, there is proposed a method of transmitting a video signal, including: acquiring the video signal, wherein the video signal contains a plurality of frame data; embedding configuration data for at least one frame data of the video signal in a previous invalid interval of the at least one frame data; and transmitting the video signal embedded with the configuration data.

For example, the embedding the configuration data for at least one frame data of the video signal in the previous invalid interval of the at least one frame data includes: determining an initial transmission position of the configuration data according to a rising edge or a falling edge of any vertical synchronization signal in the previous invalid interval; or determining an initial transmission position of the configuration data according to a rising edge or a falling edge of any horizontal synchronization signal in the previous invalid interval.

For example, the configuration data contains a plurality of blocks, and the embedding configuration data for at least one frame data of the video signal in a previous invalid interval of the at least one frame data includes: embedding the plurality of blocks of the configuration data consecutively in the previous invalid interval in a predetermined order, so that the plurality of blocks are transmitted continuously.

For example, the plurality of blocks contain one or more data packets, and each data packet contains a header identifier, valid data, and a trailer identifier.

For example, the configuration data contains a plurality of blocks, and the embedding the configuration data for the at least one frame data of the video signal in the previous invalid interval of the at least one frame data includes: taking rising edges or falling edges of a plurality of horizontal synchronization signals in the previous invalid interval respectively as initial transmission positions of the plurality of blocks; and embedding the plurality of blocks of the configuration data sequentially in the previous invalid interval in a predetermined order, based on the initial transmission positions of the plurality of blocks, so that the plurality of blocks are transmitted separately.

For example, the plurality of blocks contain one or more data packets, and each data packet contains valid data.

For example, the plurality of blocks further contain at least one of a type identifier, a packet quantity identifier, and a verification identifier, and each data packet further contains at least one of an addressing mode, an address, and a data length.

For example, the method of transmitting the video signal further includes: receiving an error feedback signal for the configuration data; and re-transmitting the video signal embedded with the configuration data based on the error feedback signal.

For example, the transmitting the video signal embedded with the configuration data includes: transmitting the video signal embedded with the configuration data through a low-voltage differential signal transmission channel.

According to another aspect of the present disclosure, there is proposed a method of receiving a video signal, including: receiving the video signal embedded with configuration data; wherein the video signal contains a plurality of frame data, and the configuration data for at least one frame data is embedded in the previous invalid interval of the at least one frame data; parsing the configuration data and the at least one frame data from the video signal; and processing the at least one frame data based on the configuration data so as to obtain processed pixel data to be displayed by a display panel.

For example, the method of receiving the video signal further includes: verifying the configuration data after parsing the configuration data from the video signal; transmitting an error feedback signal for the configuration data in response to verifying that the configuration data is erroneous.

For example, the method of receiving the video signal further includes: processing the at least one frame data based on last configuration data obtained in paring a previous frame data so as to obtain a temporary pixel data to be displayed by the display panel, after transmitting the error feedback signal for the configuration data.

According to another aspect of the present disclosure, there is proposed a device of transmitting a video signal, including: an acquisition module configured to acquire the video signal that contains a plurality of frame data; an encoding module configured to embed configuration data for at least one frame data of the video signal in the previous invalid interval of the at least one frame data; and a transmission module configured to transmit the video signal embedded with the configuration data.

According to another aspect of the present disclosure, there is proposed a device of receiving a video signal, including: a receiving module configured to receive the video signal embedded with the configuration data, wherein the video signal contains a plurality of frame data, and the configuration data for at least one frame data is embedded in the previous invalid interval of the at least one frame data; a parsing module configured to parse the configuration data and at least one frame data from the video signal; and a processing module configured to process the at least one frame data based on the configuration data so as to obtain processed pixel data to be displayed on the display panel.

According to another aspect of the present disclosure, there is proposed a display device, including: a memory configured to store instructions; and at least one processor, wherein the at least one processor is configured to execute the instructions stored in the memory so as to implement the method of transmitting the video signal and/or the method of receiving the video signal as described above.

According to another aspect of the present disclosure, there is proposed a non-transitory computer storage medium having computer readable instructions stored thereon, wherein the computer readable instructions, when executed by a computer, cause the computer to perform the method of transmitting the video signal and/or the method of receiving the video signal as described above.

According to the technical solutions of the embodiments of the present disclosure, the matching configuration data is embedded in the previous invalid interval of the frame data of the video signal, and then the video signal embedded with the configuration data may be transmitted through a single data transmission channel. There is no need to change the transmission sequence of the video signal and separately transmit the configuration data and the video signal. This not only saves hardware channels and costs, but also ensures that the configuration data is transmitted to the receiving end earlier than the associated frame data. The receiving end may then process the entire frame of data received later based on the configuration data received earlier, thereby avoiding the split display of screen on the display panel and improving the display quality.

BRIEF DESCRIPTION OF THE DRAWINGS

In order to more clearly illustrate the technical solutions in the embodiments of the present disclosure or the related art, the drawings required in the description of the embodiments are briefly introduced below. Obviously, the drawings in the following description are some embodiments of the present disclosure. For those ordinary skilled in the art, other drawings may be obtained from these drawings without carrying out any inventive effort. 下图中.

DETAILED DESCRIPTION OF EMBODIMENTS

Figure 1:
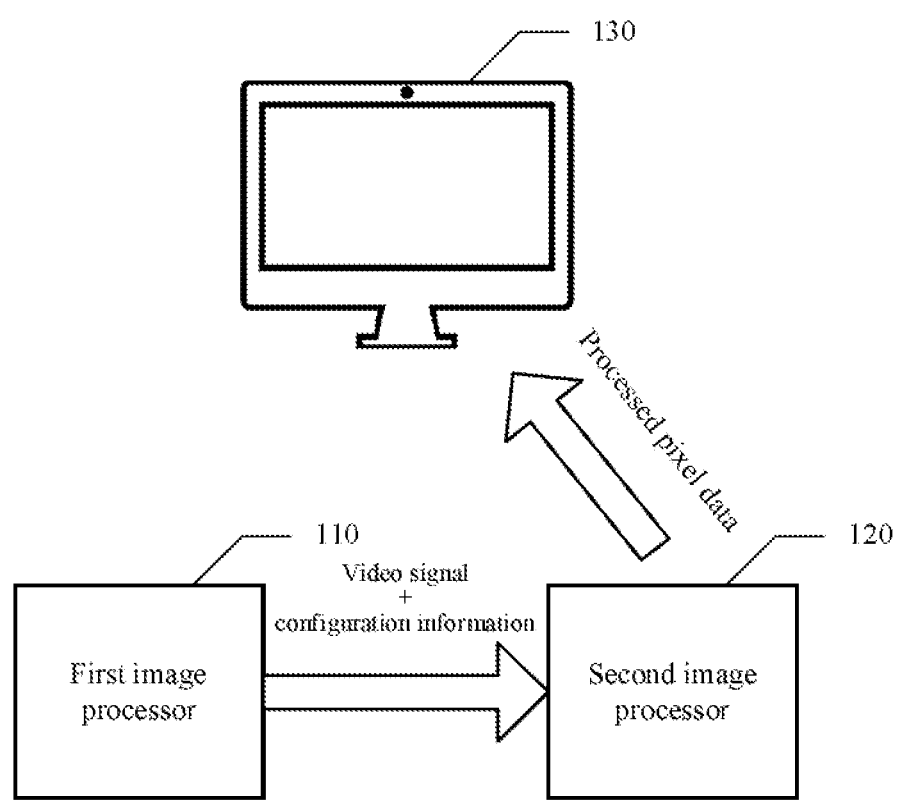
FIG. 1 schematically shows an example application scenario of a method of transmitting a video signal according to an embodiment of the present disclosure.

In order to make the objectives, technical solutions and advantages of the present disclosure more clear, the technical solutions of the present disclosure are clearly and completely described below with reference to the drawings of the embodiments of the present disclosure. Obviously, the described embodiments are only a part but not all of the embodiments of the present disclosure. Based on the embodiments of the present disclosure, all other embodiments obtained by persons of ordinary skill in the art without carrying out inventive effort fall within the protection scope of the present disclosure. It should be noted that throughout the drawings, the same elements are represented by the same or similar reference numerals. In the following description, some specific embodiments are only used for descriptive purposes, and should not be construed as limiting the present disclosure. They are merely examples of the embodiments of the present disclosure. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system including at least one of A, B and C" should include but not be limited to a system including only A, a system including only B, a system including only C, a system including A and B, a system including A and C, a system including B and C, and/or a system including A, B and C). In the case of using the expression similar to "at least one of A. B or C", it should be explained according to the meaning of the expression generally understood by those skilled in the art (for example, "a system including at least one of A. B or C" should include but not be limited to a system including only A, a system including only B, a system including only C, a system including A and B, a system including A and C, a system including B and C, and/or a system including A, B and C).

In a display system, it is often necessary to transmit a video signal from one image processor to another image processor. While the video signal is being transmitted, it is also necessary to transmit relevant configuration information and other information from the image processor as a transmitting end to the image processor as a receiving end. One processing method is to establish two data transmission channels between the two image processors. One data transmission channel is used to transmit the video signal, and the other data transmission channel is used to transmit relevant configuration information. This processing method costs high and is difficult to ensure a synchronization of signal transmissions in the two data transmission channels. If the configuration information reaches the receiving end during a transmission of a frame of video image, it is easy to cause a split display of the frame of video image and result in a non-uniform picture.

FIG. 1 schematically shows an example application scenario of a method of transmitting a video signal according to an embodiment of the present disclosure. It should be noted that FIG. 1 only shows an example of the application scenario to which the embodiments of the present disclosure may be applied so as to help those skilled in the art understand technical contents of the present disclosure. It does not mean that the embodiments of the present disclosure may not be used for other apparatuses, systems, environments or scenes.

FIG. 1 shows a scenario of video signal transmission between a first image processor 110 and a second image processor 120. For example, the first image processor 110 transmits the video signal and the configuration information to the second image processor 120. After receiving the video signal and the configuration information, the second image processor 120 processes the video signal according to the configuration information so as to obtain processed pixel data. The pixel data may be further processed by other devices with image processing capabilities, for example, it may be displayed by a display panel 130.

The first image processor 110, the second image processor 120 and the display panel 130 may be respectively provided in three electronic devices. Alternatively, any two of them are provided in the same electronic device, and the other is provided in another electronic device. Alternatively, the first image processor 110, the second image processor 120 and the display panel 130 may also be provided in the same electronic device. The electronic device mentioned above may be any device with image processing capability and/or image display capability, such as a smart T a smart phone, a notebook computer, etc., which is not limited here.

According to the embodiments of the present disclosure, there is provided a method of transmitting a video signal and a method of receiving a video signal, which are respectively described below from perspectives of the transmitting end and the receiving end. It should be noted that the sequence number of each step in the following method is only used to indicate the step for description, and should not be regarded as indicating the execution order of the steps. Unless explicitly stated, the method does not need to be performed exactly in the order shown.

Figure 2:
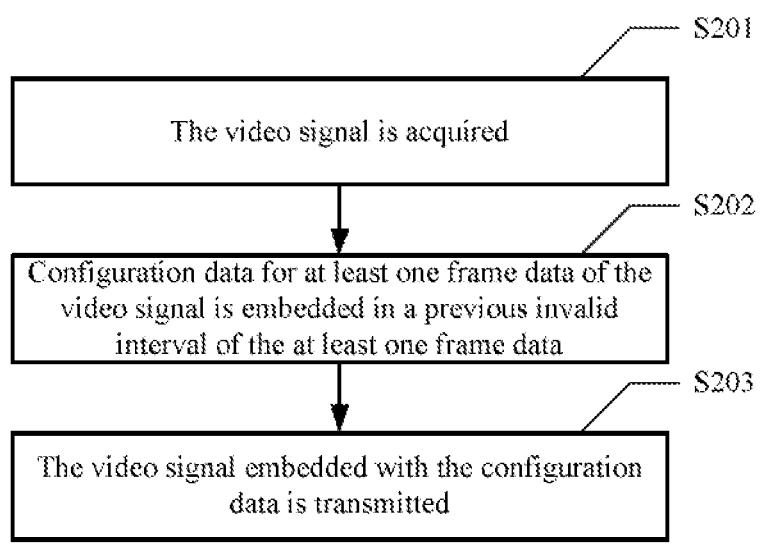
FIG. 2 schematically shows a flowchart of a method of transmitting a video signal according to an embodiment of the present disclosure.

FIG. 2 schematically shows a flowchart of a method of transmitting a video signal according to an embodiment of the present disclosure, so as to illustrate a working principle of the transmitting end of the video signal.

As shown in FIG. 2, the method may include steps S201 to S203.

In step S201, a video signal is acquired.

The video signal acquired may contain a plurality of frame data, each frame data may contain a plurality of row data, and each row data may contain a plurality of pixel data. A format of the video signal is exemplarily explained below by an example.

Figure 3A:
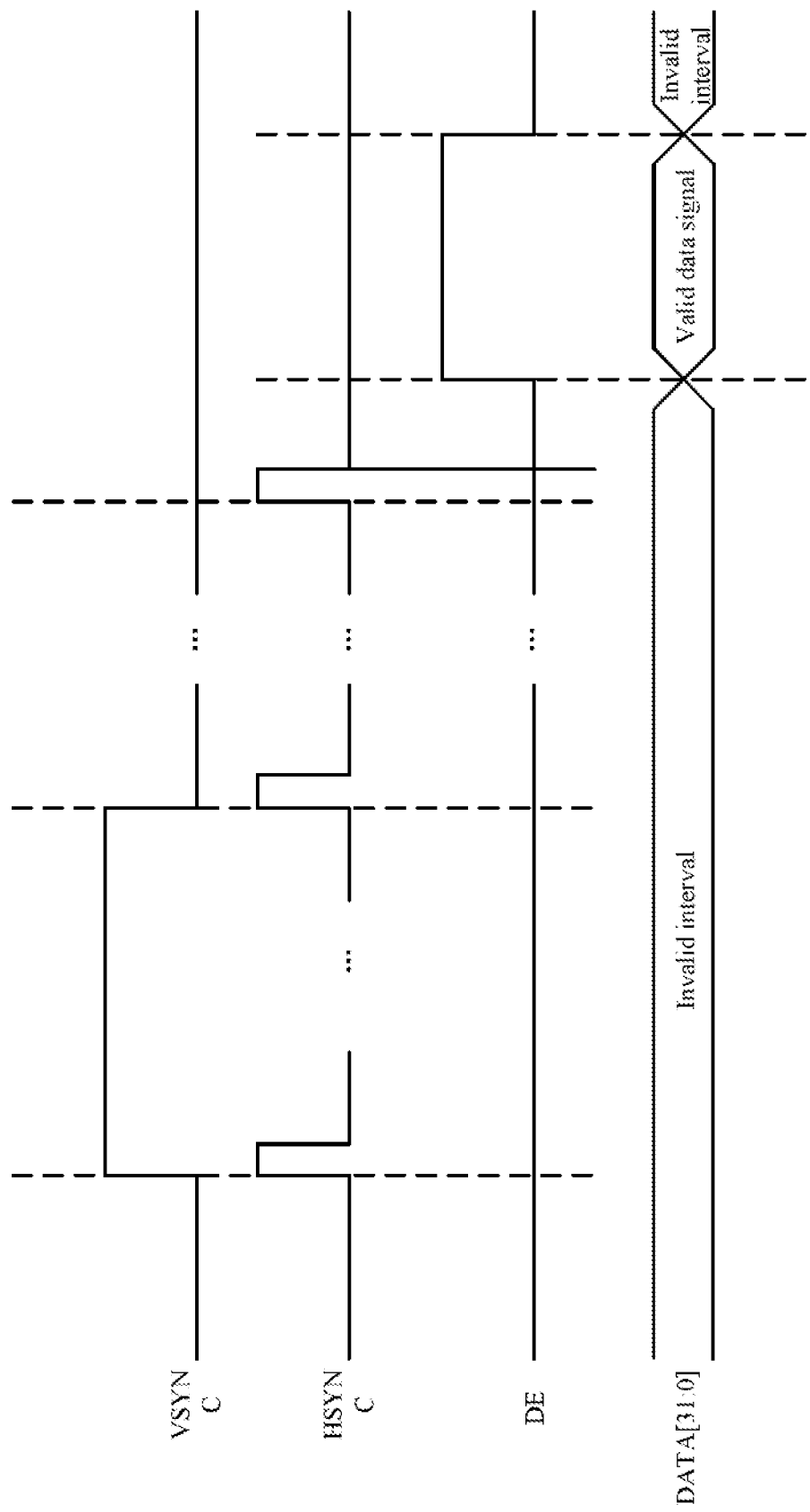
FIG. 3A schematically shows a format diagram of a video signal according to an embodiment of the present disclosure.

FIG. 3A schematically shows a format diagram of the video signal according to the embodiments of the present disclosure. As shown in FIG. 3A, the video signal contains a vertical synchronization signal (VSYNC), a horizontal synchronization signal (HSYNC), a video data enable signal (DE), and a video data signal (DATA). The VSYNC is used to indicate a beginning and an end of a video frame, the HSYNC is used to indicate a beginning and an end of a pixel row, the DE is used to select a valid data signal in the video data signal, and the DATA[31:0] indicates that each pixel data occupies 32 bits, but the amount of data may be set as needed. In this example, the DE may be a high-level valid signal. The video data signal corresponding to a high-level duration of the DE is considered to be a valid data signal, and an interval corresponding to a low-level duration of the DE is considered to be an invalid interval. The high-level duration of the DE corresponds to a valid display time of a pixel row. Therefore, each valid data signal in FIG. 3A is a row data. For a display panel with a resolution of x*y, a row data is formed by x pixel data, and there is an invalid interval between adjacent row data; a frame data is formed by y row data, and there is also an invalid interval between adjacent frame data, where x and y are positive integers.

Next, in step S202, configuration data for at least one frame data of the video signal is embedded in a previous invalid interval of the at least one frame data.

The configuration data may contain various image quality processing parameters, such as brightness, contrast, color temperature, etc., which are not limited here. In the step S202, the configuration data for each frame data of the video signal may be embedded in the previous invalid interval of the each frame data. Alternatively, in a case where a plurality of consecutive frame data contain the same configuration data, the configuration data of the plurality of consecutive frame data may be embedded only in the previous invalid interval of a first frame data of the plurality of consecutive frame data, so as to further improve processing efficiency. For example, the video signal contains frame data 1 to frame data 10. The frame data 1 contains configuration data a, the frame data 2-8 contain configuration data b, and the frame data 9-10 contain configuration data c. The configuration data a may be embedded in the previous invalid interval of the frame data 1, the configuration data b may be embedded in the previous invalid interval of the frame data 2, and the configuration data c may be embedded in the previous invalid interval of the frame data 9. The format of the video signal embedded with the configuration data is exemplarity illustrated below by an example.

Figure 3B:
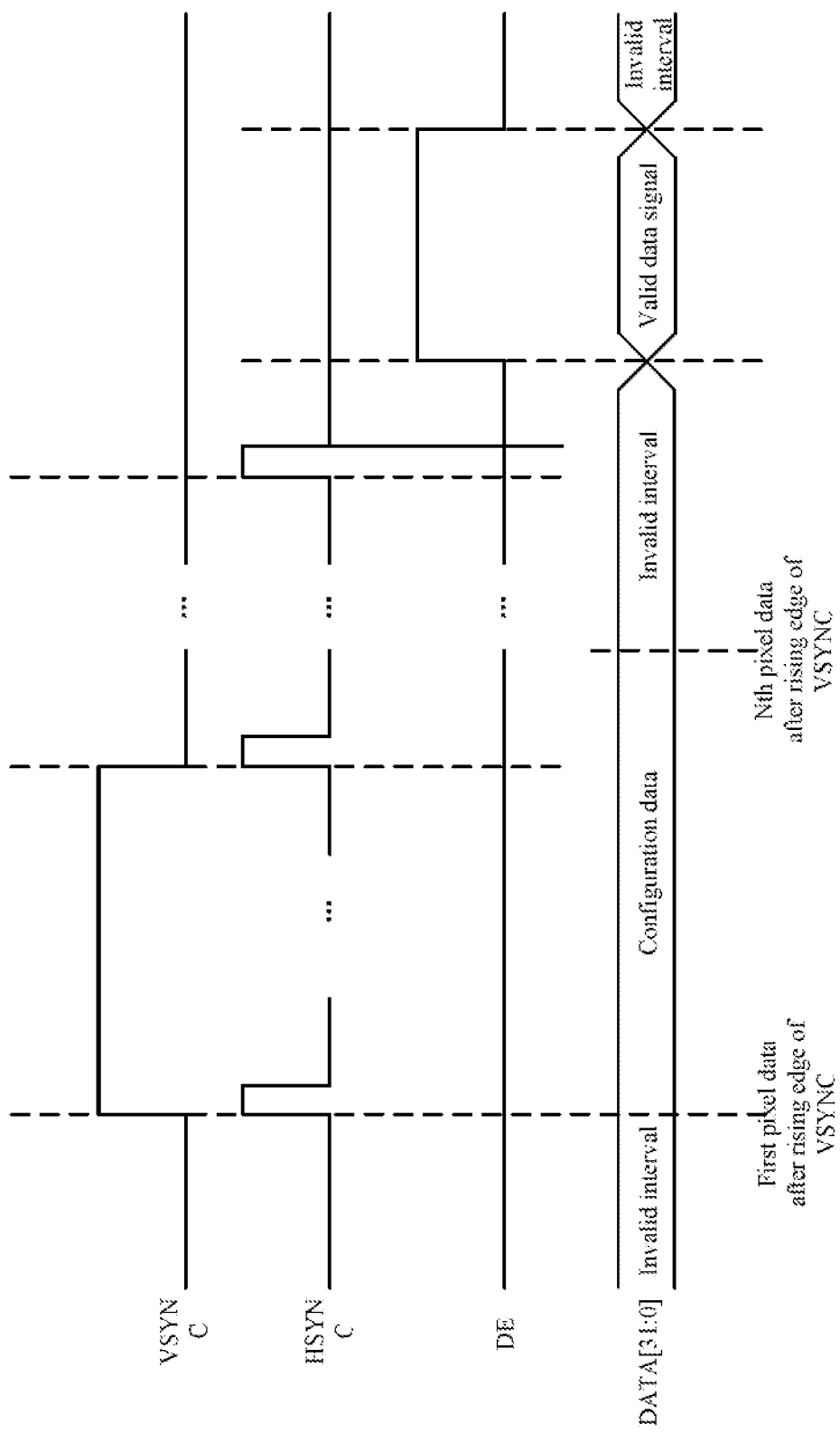
FIG. 3B schematically shows a format diagram of a video signal embedded with configuration data according to an embodiment of the present disclosure.

FIG. 3B schematically shows a format diagram of the video signal embedded with the configuration data according to the embodiments of the present disclosure, where the video signal shown in FIG. 3A embedded with the configuration data is shown. By way of example, the valid data signal shown in FIG. 3B is a first row data in a frame data. The configuration data containing N pixel data is embedded in the previous invalid interval of the valid data signal so as to obtain the video signal embedded with the configuration data, where N is a positive integer. A position where the configuration data is embedded in the invalid interval may be set according to actual needs, which is not limited here.

Then, in step S203, the video signal embedded with the configuration data is transmitted.

In an example, the video signal embedded with the configuration data may be transmitted to the receiving end through a single data transmission channel. For example, the video signal embedded with the configuration data may be transmitted through an LVDS (Low-Voltage Differential Signaling) transmission channel, or may be transmitted through other data transmission channels, which is not limited here.

Those skilled in the art may understand that in the method of transmitting the video signal shown in FIG. 2, the matching configuration data is embedded in the previous invalid interval of the frame data of the video signal on the basis of the original format of the video signal, and then the video signal embedded with the configuration data may be transmitted through a single data transmission channel. There is no need to separately transmit the configuration data and the video signal. This not only saves hardware channels and costs, but also ensures that the configuration data is transmitted to the receiving end earlier than the associated frame data. The receiving end may then process the entire frame of data received later based on the configuration data received earlier, thereby avoiding the split display of screen on the display panel.

Figure 4:
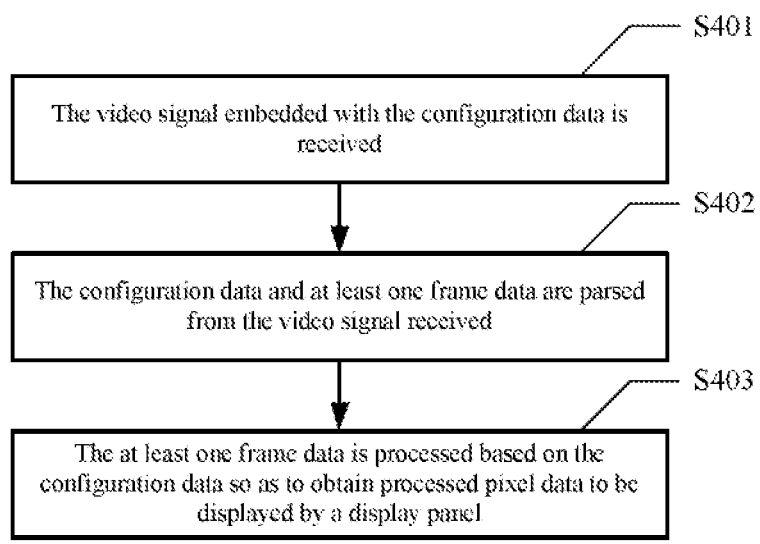
FIG. 4 schematically shows a flowchart of a method of receiving a video signal according to an embodiment of the present disclosure.

FIG. 4 schematically shows a flowchart of a method of receiving a video signal according to the embodiments of the present disclosure, so as to illustrate a working principle of the receiving end of the video signal.

As shown in FIG. 4, the method may include steps S401 to S403.

In step S401, the video signal embedded with the configuration data is received.

The video signal received may contain a plurality of frame data, and the configuration data for at least one frame data is embedded in the previous invalid interval of the at least one frame data. The embedding manner of the configuration data has been exemplified above with reference to FIG. 3A to FIG. 3B, and will not be repeated here.

Next, in step S402, the configuration data and at least one frame data are parsed from the video signal received.

Then, in step S403, the at least one frame data is processed based on the configuration data so as to obtain processed pixel data to be displayed by the display panel.

In an example, the receiving end may be provided with a buffer area for storing the configuration data parsed. In the process of receiving the video signal embedded with the configuration data, every time a configuration data is parsed, the configuration data is stored in the buffer area as updated configuration data to replace existing configuration data. The updated configuration data is used to process the frame data subsequently parsed, until another configuration data is parsed. The above process is repeated until the video signal is transmitted completely.

For example, the video signal may contain frame data 1 to frame data 5. The configuration data a may be embedded in the previous invalid interval of the frame data 1, and the configuration data b may be embedded in the previous invalid interval of the frame data 2. In the process of receiving the video signal embedded with the configuration data, the receiving end first parses the configuration data a and stores the configuration data a in the buffer area. Then the frame data 1 is parsed and processed based on the configuration data a in the buffer area, so as to obtain the processed pixel data 1. Next, the configuration data b is parsed and stored in the buffer area to replace the configuration data a. Then, the frame data 2 to the frame data 5 are parsed and respectively processed based on the configuration data b in the buffer area, so as to obtain processed pixel data 2 to pixel data 5. The processed pixel data 1 to pixel data 5 are subsequently displayed on the display panel, and a first video frame in conformity with the configuration data a and second to fourth video frames in conformity with the configuration data b may be displayed.

Those skilled in the art may understand that in the method of receiving the video signal shown in FIG. 4, the video signal embedded with the configuration data is received by the receiving end. For example, on the basis of the original format of the video signal, the matching configuration data is embedded in the previous invalid interval of the frame data of the video signal, and then the video signal is transmitted through a single data transmission channel. This not only saves hardware channels and costs, but also ensures that the configuration data is transmitted to the receiving end earlier than the associated frame data. The receiving end may then process the entire frame of data received later based on the configuration data received earlier, thereby avoiding the split display of screen on the display panel.

For example, in a display system with 8K (7680*4320) resolution, a SoC (System on a Chip) may server as the transmitting end, and an FPGA (Field-Programmable Gate Array) may server as the receiving end. The SoC generates an OSD (On Screen Display) (such as a user interaction menu) video signal. According to the traditional video signal transmission scheme, on the one hand, the SoC transmits the OSD video signal to the FPGA through an LVDS transmission channel, and on the other hand, the SoC transmits relevant configuration data (such as OSD position, OSD size, brightness, contrast, color temperature, etc.) to the FPGA through an I2C (Inter-Integrated Circuit) or an SPI (Serial Peripheral Interface). After the FPGA receives the OSD video signal, the OSD video signal is superimposed on an 8K video signal originally used for display, and the 8K video signal superimposed with the OSD video signal is processed according to the configuration data received so as to obtain the processed pixel data in conformity with the configuration data. The processed pixel data is displayed by the display panel, and a video which contains the user interaction menu and of which picture parameters conform to the user's setting may be displayed to the user.

For the above example of the SoC transmitting the video signal to the FPGA, according to the video signal transmission scheme of the embodiments of the present disclosure, the relevant configuration data may be embedded in the OSD video signal to be transmitted. If the OSD video signal is specifically a menu image, that is, it contains only one frame data, the relevant configuration data is embedded in the previous invalid interval of the frame data so as to obtain the OSD video signal embedded with the configuration data. The SoC transmits the OSD video signal embedded with the configuration data to the FPGA by using the LVDS transmission channel. After the FPGA receives the OSD video signal embedded with the configuration data, the menu image and the configuration data are parsed from the OSD video signal. The menu image is superimposed on the 8K video signal originally used for display, and the 8K video signal superimposed with the menu image is processed according to the configuration data so as to obtain the processed pixel data in conformity with the configuration data. The processed pixel data is displayed by the display panel, and the video which contains the user interaction menu and of which picture parameters conform to the user's setting may be displayed to the user.

According to the embodiments of the present disclosure, the embedding the configuration data for at least one frame data of the video signal in the previous invalid interval of the at least one frame data may include: determining an initial transmission position of the configuration data according to a rising edge or a falling edge of any vertical synchronization signal in the previous invalid interval, or determining an initial transmission position of the configuration data according to a rising edge or a falling edge of any horizontal synchronization signal in the previous invalid interval.

For example, in the example shown in FIG. 3B, the rising edge of a first vertical synchronization signal in the previous invalid interval is taken as the initial transmission position of the configuration data, and the configuration data is formed by a first pixel data to an Nth pixel data after the rising edge. In other embodiments, neither the rising or falling edge of any vertical synchronization signal nor the rising or falling edge of any horizontal synchronization signal is selected as the initial transmission position of the configuration data, as long as it is ensured that the configuration data as a whole is in the previous invalid interval of the frame data. When the rising or falling edge of any vertical synchronization signal or the rising or falling edge of any horizontal synchronization signal is selected as the initial transmission position of the configuration data, the transmitting end and the receiving end do not need to additionally agree on an initial identifier of the configuration data. When other positions in the previous invalid interval are selected as the initial transmission position of the configuration data, the transmitting end and the receiving end need to additionally agree on the initial identifier of the configuration data.

According to the embodiments of the present disclosure, the configuration data may contain a plurality of blocks. The plurality of blocks of the configuration data may be embedded in the previous invalid interval of at least one frame data of the video signal by one of method (1) and method (2) described below.

In method (1), the process of embedding the configuration data for the at least one frame data of the video signal in the previous invalid interval of the at least one frame data may include embedding the plurality of blocks of the configuration data consecutively in the previous invalid interval in a predetermined order, so that the plurality of blocks are transmitted continuously For example, the plurality of blocks of the configuration data may contain one or more data packets, each data packet may contain a header identifier, a valid data, and a trailer identifier, and the valid data is a portion that carries actual configuration information. In an organizational form of method (1), the blocks of the configuration data are continuously transmitted, that is, the data packets are continuously arranged and need to be distinguished by the header identifier and the trailer identifier of the data packet.

In method (2), the embedding the configuration data for the at least one frame data of the video signal in the previous invalid interval of the at least one frame data may include: taking rising edges or falling edges of a plurality of horizontal synchronization signals in the previous invalid interval respectively as initial transmission positions of the plurality of blocks of the configuration data, so that different blocks correspond to different initial transmission positions; and embedding the plurality of blocks of the configuration data sequentially in the previous invalid interval in a predetermined order, based on the initial transmission positions of the plurality of blocks of the configuration data, so that the plurality of blocks of the configuration data are transmitted separately. For example, the plurality of blocks of the configuration data may contain one or more data packets, each data packet may only contain the valid data, and the header identifier and the trailer identifier are not necessary. In an organizational form of method (2), the blocks of the configuration data are separately transmitted based on the rising edge or falling edge of the horizontal synchronization signal, that is, the data packets are separated from each other and may be distinguished directly without using the header identifier and the trailer identifier of the data packet, thereby saving data traffic.

The method (1) and method (2) are exemplified below with reference to FIG. 5A to FIG. 5B.

Figure 5A:
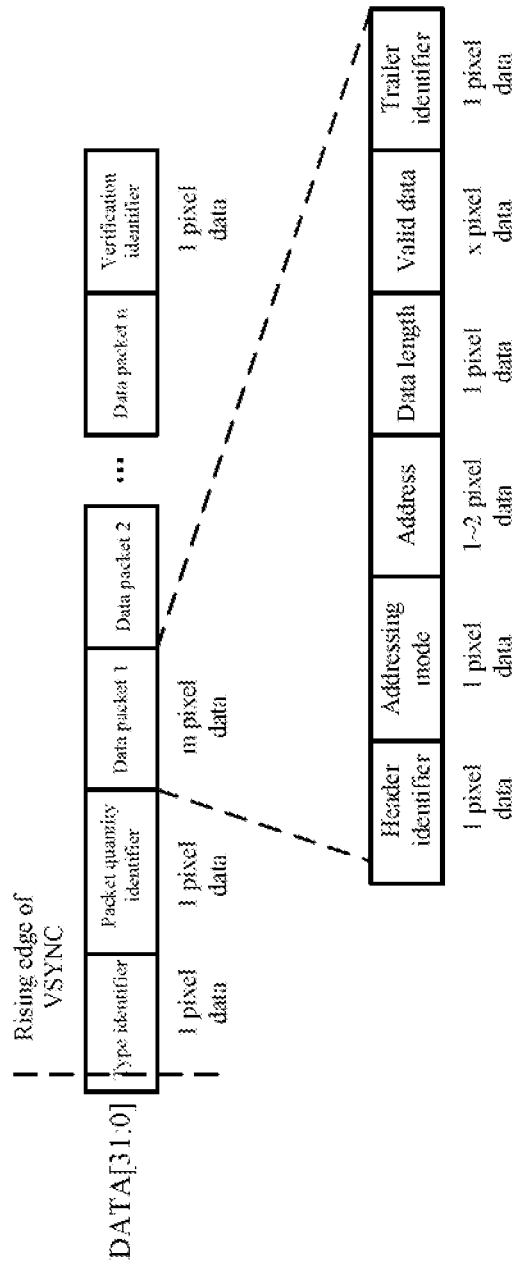
FIG. 5A shows a schematic diagram of an organization form of configuration data according to an embodiment of the present disclosure.

FIG. 5A shows a schematic diagram of an organization form of the configuration data according to the embodiments of the present disclosure. As shown in FIG. 5A, the configuration data may contain a plurality of blocks, including a type identifier, a packet quantity identifier, one or more data packets, and a verification identifier.

The type identifier may indicate a type of the configuration data transmitted. For example, "1" may indicate brightness configuration information, and "2" may indicate contrast configuration information. For example, the type identifier occupies a width of 1 pixel data, and following the setting of the video data signal (DATA[31:0]) described above, 1 pixel data occupies 32 bits. The packet quantity identifier indicates the number of data packets contained in the configuration data. For example, the packet quantity identifier occupies the width of 1 pixel data (32 bits). The verification identifier is used to verify the configuration data so as to ensure correctness and completeness of the transmission of the configuration data transmission. For example, a CRC (Cyclic Redundancy Check) verification identifier may be used, which may occupy the width of 1 pixel data.

The data packet is a basic unit of the configuration data, which may contain a header identifier, an addressing type, an address, a data length, valid data, and a trailer identifier, etc. Each data packet occupies m pixel data, which may vary according to the addressing mode and the data length. Different data packets may contain data of different types of configuration information.

For example, the header identifier and the trailer identifier may be represented by a fixed code pattern to mark the beginning and end of the data packet, which may be customized. For example, the header is defined as 0xFFFFFFFF and the trailer is defined as 0xEFFFFFFE. The addressing type is an addressing mode available for encoding, such as 0x00000001 representing 8-bit addressing, 0x00000002 representing 16-bit addressing, 0x00000003 representing 32-bit addressing, and 0x00000004 representing 64-bit addressing. The address represents the address of a register to be accessed, which has a different width depending on the addressing type. For example, in a case of 8-bit addressing, 16-bit addressing or 32-bit addressing, the width of 1 pixel data is occupied, and in a case of 64-bit addressing, the width of 2 pixel data is occupied. The data length represents a length of following data (the width of the pixel data occupied). For example, the data length of x indicates that the width of x pixel data is occupied, where x is a positive integer. The valid data is the valid data that meets the definition of the data length, that is, the configuration data written to the register of the corresponding address.

In the example shown in FIG. 5A, the rising edge of a vertical synchronization signal in the previous invalid interval is taken as the initial transmission position of the configuration data, and the blocks described above are arranged consecutively, that is, the organization form of the method (1) is adopted. Under this organizational form, the configuration data needs to distinguish different data packets through the header identifier and the trailer identifier. Since the header identifier and the trailer identifier use two fixed code patterns to define the beginning and end of the data packet, these two specific code patterns may not be used in other positions of the data transmitted. In some cases, there are certain restrictions on the use of data. In this case, the organization form of the method (2) shown in FIG. 5B (2) may be adopted.

Figure 5B:
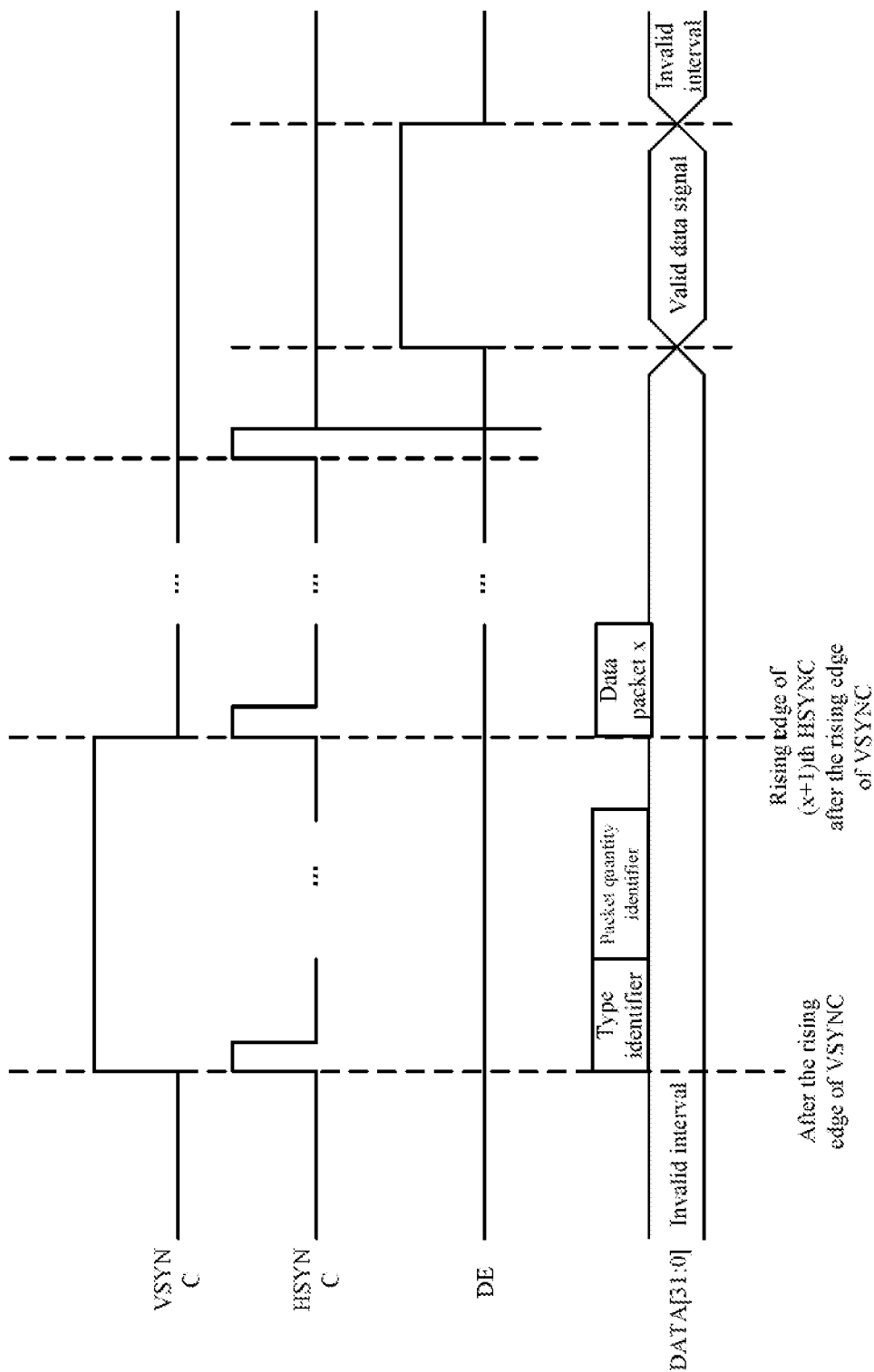
FIG. 5B shows a schematic diagram of an organization form of configuration data according to another embodiment of the present disclosure.

FIG. 5B shows a schematic diagram of an organization form of the configuration data according to another embodiment of the present disclosure. As shown in FIG. 5B, the configuration data may contain a plurality of blocks, including a type identifier, a packet quantity identifier, one or more data packets, and a verification identifier. Exemplarily, the type identifier and the packet quantity identifier occupy two consecutive pixel data after the rising edge of a horizontal synchronization signal in the previous invalid interval. Then, a data packet is placed after the rising edge of each horizontal synchronization signal following the rising edge of the horizontal synchronization signal, which occupies the first pixel data to the mth pixel data after the rising edge of the each horizontal synchronization signal, where in is a positive integer. Since the data packet is placed after the rising edge of the each horizontal synchronization signal, the header identifier and the trailer identifier of the data packet may be removed relying on the synchronization effect of the rising edge of the horizontal synchronization signal. The CRC verification identifier may take the rising edge of the horizontal synchronization signal next to the horizontal synchronization signal corresponding to the last data packet as the initial transmission position, and it may, for example, occupy 1 pixel data.

In addition, in the organization form of the method (2), the type identifier and the packet quantity identifier may also be placed separately. For example, the rising edge of the first horizontal synchronization signal is taken as the initial transmission position of the type identifier, the rising edge of the second horizontal synchronization signal is taken as the initial transmission position of the packet quantity identifier, and so on, until the verification identifier is placed in the previous invalid interval of the frame data. In some cases, the organization form of the method (2) limits the number of the data packets. For example, a maximum number of the data packets should be a total number of the horizontal synchronization signals in the previous invalid interval minus 3 (that is, 1 horizontal synchronization signal occupied by the type identifier, 1 horizontal synchronization signal occupied by the packet quantity identifier, and 1 horizontal synchronization signal occupied by the verification identifier).

In the example described above, the number of the blocks in the configuration data, the pixel data occupied by each block, the bits occupied by each pixel data, etc. are all used to exemplify the implementation principle of the present disclosure, which may be set according to actual needs and does not limit the present disclosure. In other embodiments, the organization form of the configuration data in the video signal may also be different from those in the method (1) and method (2) according to actual needs, as long as it is ensured that the configuration data as a whole is located in the previous invalid interval of the corresponding frame data.

According to the embodiments of the present disclosure, a verification feedback mechanism for the configuration data embedded in the video signal is further provided. Exemplarily, in the video signal transmission scheme according to the embodiments of the present disclosure, the transmitting end transmits the video signal embedded with the configuration data to the receiving end, and the receiving end parses the configuration data from the video signal and then verifies the configuration data. If it is verified that the configuration data is erroneous, the receiving end transmits an error feedback signal for the configuration data to the transmitting end. Accordingly, the transmitting end may receive the error feedback signal for the configuration data, and re-transmit the video signal embedded with the configuration data to the receiving end based on the error feedback signal.

For example, in the examples shown in FIG. 5A to FIG. 5B, after receiving the video signal embedded with the configuration data, the receiving end may verify the configuration data according to the CRC verification identifier of the configuration data. If a CRC error is found, the receiving end may give an error feedback to the transmitting end through a preset feedback channel. The feedback channel may be an IO (for example, a high level represents error, and a low level represents correct) interface, or an I2C interface, etc. In this case, the configuration data received by the receiving end is not valid, the receiving end may discard the configuration data with error, and the configuration data in the buffer area of the receiving end is not updated. The valid data signal received is processed based on the updated configuration data to obtain a temporary pixel data to be subsequently displayed by the display panel. After receiving the error feedback signal, the transmitting end transmits the next frame data together with the previous configuration data that was not successfully transmitted.

Figure 6:
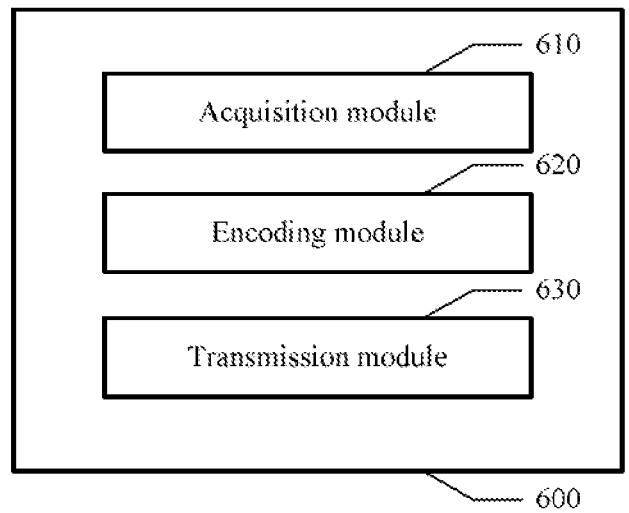
FIG. 6 schematically shows a block diagram of a device of transmitting a video signal according to an embodiment of the present disclosure.

FIG. 6 schematically shows a block diagram of a device 600 of transmitting a video signal according to an embodiment of the present disclosure. The device 600 of transmitting the video signal is applied to the transmitting end.

As shown in FIG. 6, the device 600 of transmitting the video signal may include an acquisition module 610, an encoding module 620 and a transmitting module 630.

The acquisition module 610 is used to acquire the video signal that contains a plurality of frame data.

The encoding module 620 is used to embed configuration data for at least one frame data of the video signal in the previous invalid interval of the at least one frame data.

The transmitting module 630 is used to transmit the video signal embedded with the configuration data.

Figure 7:
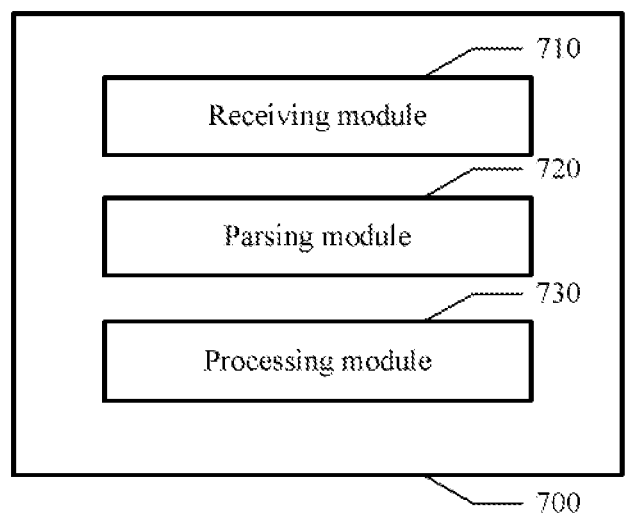
FIG. 7 schematically shows a block diagram of a device of receiving a video signal according to an embodiment of the present disclosure, and FIG. 8 schematically shows a block diagram of a display device according to an embodiment of the present disclosure.

FIG. 7 schematically shows a block diagram of a device 700 of receiving a video signal according to an embodiment of the present disclosure. The device 700 of receiving the video signal is applied to the receiving end.

As shown in FIG. 7, the device 700 of receiving the video signal may include a receiving module 710, a parsing module 720 and a processing module 730.

The receiving module 710 is used to receive the video signal embedded with the configuration data. The video signal contains a plurality of frame data, and the configuration data for at least one frame data is embedded in the previous invalid interval of the at least one frame data.

The parsing module 720 is used to parse the configuration data and at least one frame data from the video signal.

The processing module 730 is used to process the at least one frame data based on the configuration data so as to obtain processed pixel data to be displayed on the display panel.

It should be noted that implementation modes, to-be-solved technical problems, achieved functions, and achieved technical effects of the modules/units/subunits in the device embodiments are the same as or similar to those of the corresponding steps in the method embodiments, which will not be repeated here.

Any number of the modules, sub modules, units and sub units according to the embodiments of the present disclosure, or at least part of the functions of any number of them may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, performs the corresponding functions.

Figure 8:
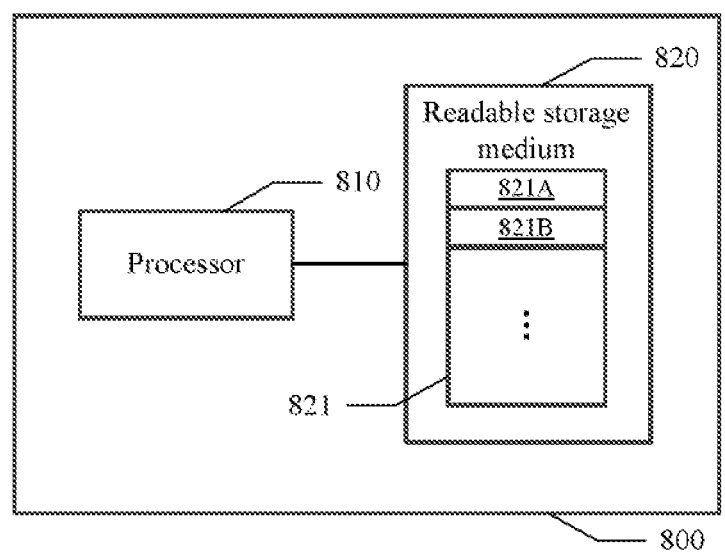

FIG. 8 schematically shows a block diagram of a display device suitable for implementing the method described above according to the embodiments of the present disclosure. The display device shown in FIG. 8 is only an example, and should not bring any limitation to the function and scope of use of the embodiments of the present disclosure.

As shown in FIG. 8, a display device 800 includes one or more processors 810 and a computer-readable storage medium 820. The display device 800 may perform the method of transmitting the video signal and/or the method of receiving the video signal according to the embodiments of the present disclosure.

For example, the processor 810 may include, for example, a general-purpose microprocessor, an instruction set processor and/or a related chipset and/or a special-purpose microprocessor (for example, an application specific integrated circuit (ASIC)), and the like. The processor 810 may also include an on-board memory for caching purposes. The processor 810 may be a single processing unit or a plurality of processing units for executing different actions of the method flow according to the embodiments of the present disclosure.

The computer-readable storage medium 820, for example, may be a non-transitory computer-readable storage medium. Specific examples include, but are not limited to: a magnetic storage device, such as a magnetic tape or a hard disk (HDD); an optical storage device, such as a compact disc (CD-ROM); a memory, such as a random access memory (RAM) or a flash memory; and so on.

The computer-readable storage medium 820 may contain a computer program 821. The computer program 821 may contain code/computer-executable instructions that, when executed by the processor 810, cause the processor 810 to perform the method according to the embodiments of the present disclosure or any modification thereof.

The computer program 821 may be configured as a computer program code containing, for example, computer program modules. For example, in the exemplary embodiments, the code in the computer program 821 may contain one or more program modules, such as 821A, 821B, . . . . It should be noted that the division method and number of modules are not fixed. Those skilled in the art may use appropriate program modules or program module combinations according to actual conditions. When these program module combinations are executed by the processor 810, they may cause the processor 810 to perform the method according to the embodiments of the present disclosure or any modification thereof.

The present disclosure further provides a computer-readable storage medium, which may be included in the apparatus/device/system described in the above embodiments; or exist alone without being assembled into the apparatus/device/system. The computer-readable storage medium described above carries one or more programs that, when executed, perform the method of transmitting the video signal and/or the method of receiving the video signal according to the embodiments of the present disclosure.

According to the embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

Although the present disclosure has been shown and described with reference to specific exemplary embodiments of the present disclosure, those skilled in the art should understand that without departing from the spirit and scope of the present disclosure defined by the appended claims and their equivalents, various modifications in form and details may be made to the present disclosure. Therefore, the scope of the present disclosure should not be limited to the embodiments described above, but should be defined by the appended claims and their equivalents.

What is claimed is:

1. A method of transmitting a video signal, comprising:
    acquiring the video signal, wherein the video signal contains a plurality of frame data;
    embedding configuration data for at least one frame data of the video signal in a previous invalid interval of the at least one frame data; and
    transmitting the video signal embedded with the configuration data,
    wherein the embedding configuration data for at least one frame data of the video signal in a previous invalid interval of the at least one frame data comprises:
    determining an initial transmission position of the configuration data based on a rising edge or a falling edge of any vertical synchronization signal in the previous invalid interval; or determining an initial transmission position of the configuration data based on a rising edge or a falling edge of any horizontal synchronization signal in the previous invalid interval.

2. The method of claim 1, wherein the configuration data contains a plurality of blocks; and
    wherein the embedding configuration data for at least one frame data of the video signal in a previous invalid interval of the at least one frame data comprises:
    embedding the plurality of blocks of the configuration data consecutively in the previous invalid interval in a predetermined order, so that the plurality of blocks are transmitted continuously.

3. The method of claim 2, wherein the plurality of blocks contain one or more data packets, and each data packet contains a header identifier, valid data, and a trailer identifier.

4. The method of claim 1, wherein the configuration data contains a plurality of blocks; and
wherein the embedding configuration data for at least one frame data of the video signal in a previous invalid interval of the at least one frame data comprises:
taking rising edges or falling edges of a plurality of horizontal synchronization signals in the previous invalid interval respectively as initial transmission positions of the plurality of blocks; and
embedding the plurality of blocks of the configuration data sequentially in the previous invalid interval in a predetermined order, based on the initial transmission positions of the plurality of blocks, so that the plurality of blocks are transmitted separately.

5. The method of claim 4, wherein the plurality of blocks contain one or more data packets, and each data packet contains valid data.

6. The method of claim 3, wherein the plurality of blocks further contain at least one of a type identifier, a packet quantity identifier, and a verification identifier; and
wherein each data packet further contains at least one of an addressing mode, an address, and a data length.

7. The method of claim 1, further comprising:
receiving an error feedback signal for the configuration data; and
re-transmitting the video signal embedded with the configuration data based on the error feedback signal.

8. The method of claim 1, wherein the transmitting the video signal embedded with the configuration data comprises:
transmitting the video signal embedded with the configuration data through a low-voltage differential signal transmission channel.

9. A method of receiving a video signal, comprising:
receiving the video signal embedded with configuration data, wherein the video signal contains a plurality of frame data, and the configuration data for at least one frame data is embedded in a previous invalid interval of the at least one frame data;
parsing the configuration data and the at least one frame data from the video signal; and
processing the at least one frame data based on the configuration data so as to obtain processed pixel data to be displayed by a display panel,
wherein the method further comprising:
verifying the configuration data after parsing the configuration data from the video signal; and
transmitting an error feedback signal for the configuration data in response to verifying that the configuration data is erroneous.

10. The method of claim 9, further comprising:
processing the at least one frame data based on last configuration data obtained in paring a previous frame data so as to obtain a temporary pixel data to be displayed by the display panel, after transmitting the error feedback signal for the configuration data.

11. A device of transmitting a video signal, comprising:
an acquisition module configured to acquire the video signal, wherein the video signal contains a plurality of frame data;
an encoding module configured to embed configuration data for at least one frame data of the video signal in a previous invalid interval of the at least one frame data, wherein an initial transmission position of the configuration data is determined based on a rising edge or a falling edge of any vertical synchronization signal in the previous invalid interval, or is determined based on a rising edge or a falling edge of any horizontal synchronization signal in the previous invalid interval; and
a transmission module configured to transmit the video signal embedded with the configuration data.

12. A device of receiving a video signal, comprising:
a receiving module configured to receive the video signal embedded with configuration data, wherein the video signal contains a plurality of frame data, and the configuration data for at least one frame data is embedded in a previous invalid interval of the at least one frame data;
a parsing module configured to parse the configuration data and the at least one frame data from the video signal; and
a processing module configured to process the at least one frame data based on the configuration data so as to obtain processed pixel data to be displayed by a display panel, wherein the processing module is further configured to: verify the configuration data after parsing the configuration data from the video signal; and transmit an error feedback signal for the configuration data in response to verifying that the configuration data is erroneous.

13. A display device, comprising:
a memory configured to store instructions; and
at least one processor,
wherein the at least one processor is configured to execute the instructions stored in the memory so as to implement the method of claim 1.

14. A display device, comprising:
a memory configured to store instructions; and
at least one processor,
wherein the at least one processor is configured to execute the instructions stored in the memory so as to implement the method of claim 9.

15. A non-transitory computer storage medium having computer readable instructions stored thereon, wherein the computer readable instructions, when executed by a computer, cause the computer to perform the method of claim 1.

16. A non-transitory computer storage medium having computer readable instructions stored thereon, wherein the computer readable instructions, when executed by a computer, cause the computer to perform the method of claim 9.

* * * * *